United States Patent Office 2,960,762
Patented Nov. 22, 1960

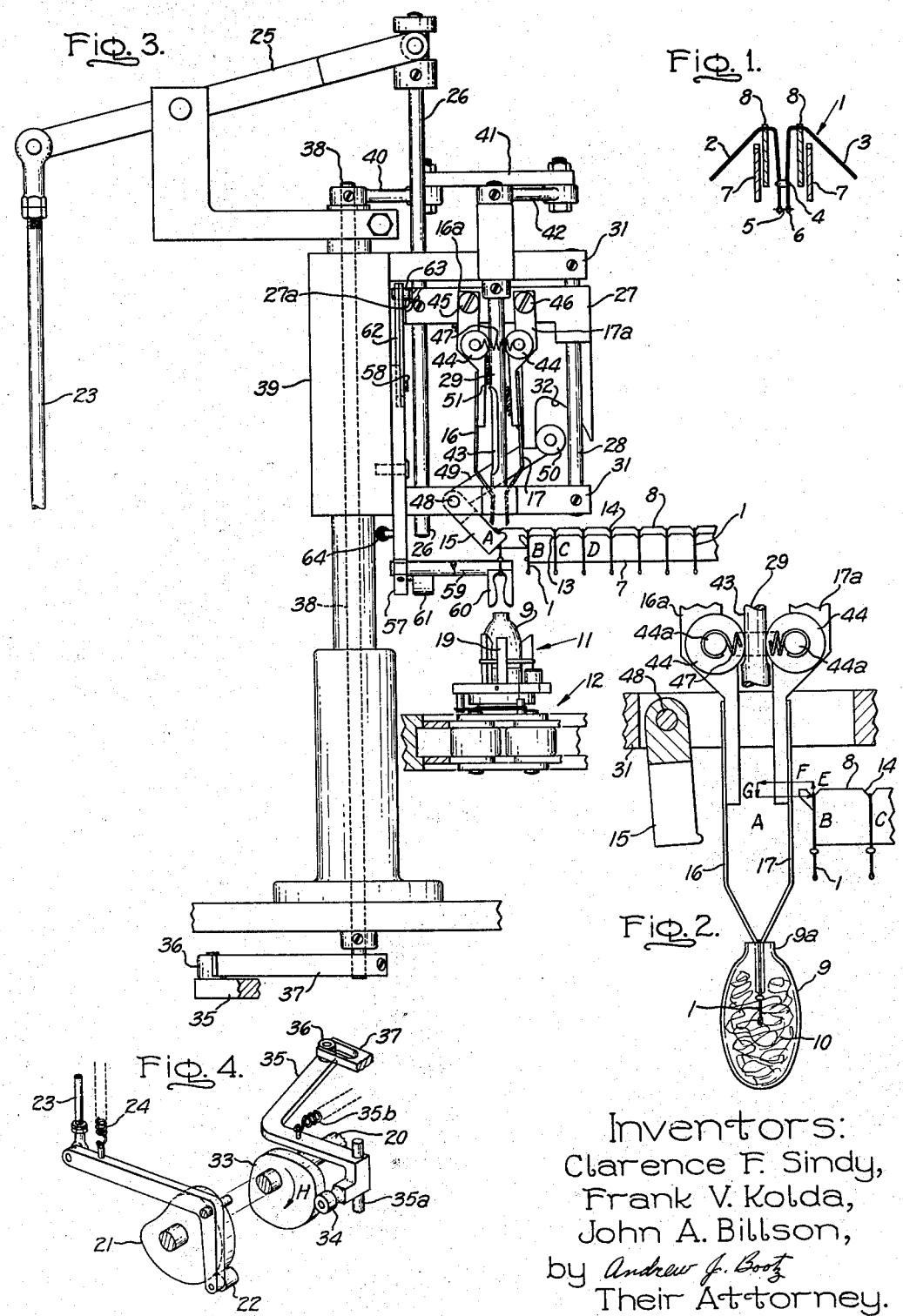

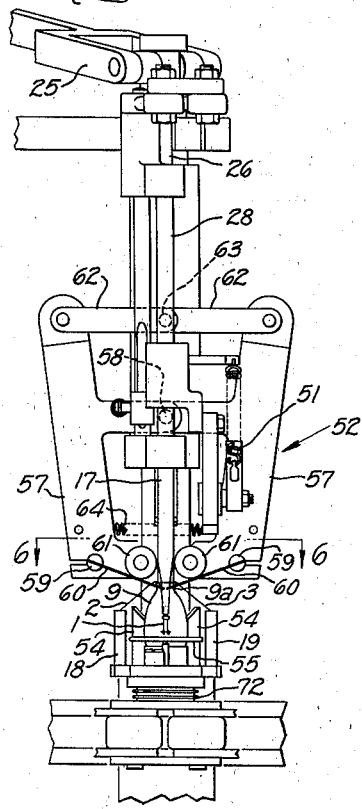

2,960,762

MOUNT THREADING APPARATUS

Clarence F. Sindy, Willoughby, Frank V. Kolda, Independence, and John A. Billson, Willoughby, Ohio, assignors to General Electric Company, a corporation of New York Filed Apr. 15, 1957, Ser. No. 652,895

9 Claims. (Cl. 29—203)

Our invention relates to electric lamp making apparatus, and more particularly, to apparatus for threading mounts in photoflash lamp bulbs which have previously been filled with combustible material.

In the manufacture of electric lamps, the filament mount and lamp bulb are assembled prior to the sealing, exhausting and gas filling of the bulb. Automatic machinery is known in the art for threading or assembling the mounts in the lamp bulbs, for example, that disclosed in U.S. Patent 2,098,030—Donovan, et al., and assigned to the same assignee as the present application. Heretofore, difficulty has been experienced when the mount is threaded by conventional apparatus into a bulb which has previously been filled with combustible foil or other substances, such as is employed for photoflash lamps. Such difficulties arose both in centering the mount within the lamp bulb and in retaining the mount in proper and accurate position in the bulb during the sealing operation as there was a tendency of the filling material to oppose the threading and centering of the mount and to push the mount out of the bulb after the mount had been threaded. The present invention overcomes these difficulties.

Therefore, it is an object of the invention to provide apparatus for positive loading of mounts in electric lamp bulbs.

Another object of the invention is to provide apparatus with means for retaining the mount in accurate position after the mount has been centered within the electric lamp bulb.

Another object of the invention is to provide apparatus for threading mounts in photoflash lamp bulbs which have previously been filled with combustible material.

Further objects and advantages of our invention will become apparent as the following description proceeds and the features of novelty which characterize our invention will be pointed out with particularity in the claims annexed to and forming a part of this specification.

Briefly stated, the apparatus for threading amounts in electric lamps, particularly photoflash lamps, comprises means for gripping the mount and threading the mount by positive force. Magnetic means are provided for retaining the mount in assembled position after threading is completed.

The nature of the invention will best be understood when described in connection with the accompanying drawings, in which Fig. 1 is an elevation view of a lamp mount on a mount conveyor which may be threaded by the apparatus of the present invention; Fig. 2 is a partial elevation view showing the threading means and the photoflash lamp bulb; Fig. 3 is the side elevation view of the mount threading apparatus; Fig. 4 is a schematic view af the operating cams for the mount threading apparatus; Fig. 5 is a front elevation view of the mount threading apparatus; Fig. 6 is a plan view of the bulb conveying track taken along plane 6—6 of Fig. 5 and disclosing possible arrangements of mount threading apparatus with the bulb conveying track; Fig. 7 is a plan view of a bulb holder on the bulb conveying track; Fig. 8 is an elevation view of a lamp bulb in a bulb holder, partly in section, taken along plane 8—8 of Fig. 7; and Fig. 9 is a sectional view of a bulb holder taken along plane 9—9 of Fig. 8.

The typical lamp mount suitable for use with the apparatus of the present invention is illustrated generally at 1 in Fig. 1. Such mounts preferably comprise a pair of leading-in wires 2 and 3 elongated parallel portions of which are held together by a bead 4 of insulating material such as glass and which support the filament 5 at their inner ends. The inner ends of the leading-in wires 2 and 3 and the filament 5 may contain a primer 6 for igniting the assembled photoflash lamp. The outer ends of the leading-in wires extend transversely to the inner ends and are bent back so as to be at an angle to the mid-portion and extend in opposite directions therefrom. The mount 1 is supported and conveyed to the mount threading apparatus by two pair of mount conveyors 7 and 8 as described below.

Referring now to Figs. 2, 3 and 5, a photoflash lamp bulb 9 which has previously been filled with combustible material 10 such as shredded aluminum foil is carried by a bulb holder 11, secured to a bulb conveyor 12 which moves the bulb 9 into mount loading position with respect to the mount threading apparatus.

The mount conveyors 7 and 8 contain V-shaped grooves 13 and 14, respectively, which form mount stations. A mount is advanced a station at a time to station A, the mount being advanced in the following manner: The V-shaped grooves 14 in mount conveyor 8 are aligned longitudinally and horizontally with V-shaped grooves 13 in mount conveyor 7, as illustrated in Fig. 3. Mount conveyor 8 then moves vertically the distance represented by the arrow E, Fig. 2, picking up a mount 1 in each of its V-shaped grooves 14. Mount conveyor 8 is then advanced horizontally, as represented by arrow F, Fig. 2. The mount conveyor 8 then moves vertically downward, as represented by the arrow G, Fig. 2, at which position all the mounts, except the mount at station A, are transferred from V-shaped grooves 14 on mount conveyor 8 to V-shaped grooves 13 on mount conveyor 7. At this time an intermediate mount holder 15 having pivoted spaced arms has moved into the position indicated in Fig. 3, as will be hereinafter explained, and the mount contained in groove 14 of conveyor 8 at station A is picked up and held by the arms of intermediate mount holder 15. Mount conveyor 8 then moves vertically downward, retracts horizontally and is in position to begin vertical upward movement to repeat its cycle of indexing.

In order to remove the lamp mount from the intermediate holder and place it in the lamp bulb, finger-like jaws 16 and 17 move downward between the spaced arms of holder 15 and grip the mount 1 just above the glass bead 4. As jaws 16 and 17 continue their downward movement, the intermediate mount holder 15 moves out of the path of the jaws, assuming the positon indicated in Fig. 2, and the jaws gripping the mount place the mount in position in the bulb 9 as indicated in Fig. 2. As shown most clearly in Figs. 2 and 5, the finger-like ends of the jaws grasp the elongated, parallel portions of the mount lead-in wires 2 and 3 along their lengths above the bead 4 and then the finger-like ends themselves, along with the mount, are inserted into the interior of the bulb. This means that the relatively fragile mount structure is protected against flexure, bending or damage as it is inserted into the bulb. In particular, the mount is held against any deformation or misalignment in the event it tends to rub against or contact the combustible filling material 10. Magnets 18 and 19 (Fig. 5) are provided to hold the mount 1, which is of suitable material to be attracted by the magnets, accurately in position as placed by the jaws 16 and 17. The jaws 16 and 17 then open and are retracted vertically out of the lamp bulb.

The proper sequentially timed motion is imparted to the jaws 16 and 17 and to the intermediate mount holder 15 through a series of cams, levers and drives. Referring to Figs. 3 and 4, a cam shaft 20 is rotated clockwise as indicated by arrow H, in timed relation to the indexing of the bulb conveyor 12 and the movement of the mount conveyor 8. Cam 21 carried by shaft 20 imparts motion to a follower 22 which in turn imparts vertical movement to an operating lever 23 against the action of spring 24. Vertical movement of operating lever 23 imparts angular rocking motion to yoke 25, which in turn imparts vertical movement to control 26. Control rod 26 is vertically movable with respect to a stationary frame member 31, rod 26 passing through holes in the member. A movable frame member 27 is secured to the control rod 26 in any suitable way and moves vertically therewith. The movable frame member 27 moves vertically with respect to a stationary rod 28 which passes through a hole in the movable frame member 27. An intermediate mount holder cam track 32 is secured to the movable frame member 27 and reciprocates therewith.

A jaw-opening cam 33 rotates in timed relation with the main cam shaft 20 of the machine. Rotation of the jaw-opening cam 33 imparts motion to the follower 34 which in turn angularly rotates member 35 about stationary support 35a against the action of a spring 35b. A roller 36, secured to one end of member 35, mates with a fork 37 so as to rotate fork 37. Fork 37 is securely fastened to a center rotatable shaft 38 which extends through stationary center post 39 of the machine. The center shaft 38 is securely fastened to a link 40 so that rotation of fork 37 is transmitted to link 40. Link 42 is approximately parallel to link 40 and is operatively connected thereto through member 41, which member is pivoted at both its ends to links 40 and 42, respectively. Rotation of link 40 is transferred to link 42 through member 41. Link 42 is securely fastened to a jaw-opening shaft 29 rotatable in frame member 31.

The jaw-opening shaft 29 is in this manner rotated in timed sequence to the vertical movement of the movable frame member 27, both of which motions occur in timed sequence (through the proper timing of main cam shaft 20) to the indexing of the bulb conveyor 12 and the indexing of the mount 1 by the movable mount conveyor 8.

The opening and closing of jaws 16 and 17 is performed by the jaw-opening shaft 29. Shaft 29 is formed with two parallel flat cam surfaces 43. Two cam followers or rollers 44 are mounted on bearings 44a carried by the enlarged upper ends 16a and 17a of the finger-like jaws 16 and 17. The upper ends 16a and 17a of the jaws are pivoted to the movable frame member 27 by means of pins 45 and 46. The jaws 16 and 17 are closed whenever the jaw-opening rollers 44 are in contact with the flat surfaces 43 of the jaw-opening shaft 29, while the jaws 16 and 17 are open whenever the jaw-opening rollers 44 are in contact with any cylindrical part of the jaw-opening shaft. A spring 47 extending between bearings 44a biases the jaws 16 and 17 into the closed position.

The intermediate mount holder 15 is securely fastened to a shaft 48, which shaft is free to rotate with respect to the stationary frame members 31. Lever 49 is also securely fastened to shaft 48 so that rotation of lever 49 imparts rotational motion to the intermediate mount holder 15 to move it into and out of mount receiving position. Secured to the free end of lever 49 is a roller 50, which is in contact with the intermediate mount holder cam track 32. As stated above, the cam track 32 is securely fastened to the movable frame member 27. Vertical downward movement of the movable frame member 27 rotates the lever 49 and roller 50 in a clockwise direction (as viewed in Fig. 3) to withdraw the intermediate mount holder 15 out of the path of operation of the jaws 16 and 17 to the position illustrated in Fig. 2. The lever 49 and the intermediate mount holder 15 is biased to the position shown in Fig. 3 by a spring 51.

The operation of the apparatus thus far described is as follows: With the jaws 16 and 17 up and open, as illustrated in Fig. 3, the bulb conveyor track 12 is indexed to bring a lamp bulb 9 into proper mount loading position, and the movable mount conveyor 8 is indexed to move a mount 1 into mount station A. With the intermediate mount holder 15 in operative position to receive the mount from the mount conveyor 8, the mount 1 is deposited on the intermediate mount holder 15 and the mount conveyor 8 is withdrawn in the manner previously described. The movable frame member 27 then begins its downward movement by virtue of the rotation of cam 21. Jaws 16 and 17, the upper ends of which are pivoted to movable frame member 27, are moved downwardly. Jaw 16 passes between the spaced arms of the intermediate mount holder 15 while jaw 17 passes to the outside of the intermediate mount holder 15. Lamp mount 1 is now between the open jaws 16 and 17. As the jaws move downwardly, the rollers 44 come in contact with the flat surfaces 43 on shaft 29 and permit the spring 47 to close the jaws 16 and 17 around the lamp mount 1. Continued downward movement of the movable frame member 27 brings roller 50 into contact with the arcuate portion of the cam track 32 causing lever 49 to rotate clockwise. This in turn rotates the intermediate mount holder 15 clockwise so that it moves out of the path of travel of the jaws 16 and 17.

Continued downward movement of the main frame 27 moves the jaws 16 and 17 so as to insert the mount 1 into the bulb 9 by positive force to the position illustrated in Fig. 2. An advantage of the construction is that the finger-like jaws 16 and 17 grip the parallel portions of the leading-in wires at a point immediately adjacent the glass bead 4 and so hold the mount against deflection or damage as it is inserted into the lamp bulb 9. The free ends of the leading-in wires 2 and 3 are brought in contact with the magnets 18 and 19 outside the lamp bulb, and are thereby securely held in place and retain the mount 1 in the lamp bulb 9.

With the mount 1 in position in the bulb 9, the jaws are withdrawn. The main cam 21 begins the upward movement of the movable frame member 27. At the same time the jaw-opening cam 33 has assumed a position which begins rotation of shaft 29. The jaw-opening shaft 29 is rotated sufficiently so that the jaw-opening rollers 44 are out of contact with the flat surfaces 43 of the jaw-opening shaft 29 and are in contact with the cylindrical portion of the shaft 29. As explained above the jaws are now open. The jaws 16 and 17, movable frame member 27, and cam track 32 continue upward movement. As the intermediate mount holder cam track 32 moves upward, the intermediate mount holder 15, lever 49, and roller 50 move counterclockwise (as viewed in Fig. 3) and the intermediate mount holder 15 assumes the position illustrated in Fig. 3 so as to receive another lamp mount 1 at station A. Indexing of the bulb conveyor 12 and the movable mount conveyor 8 begins the cycle of operation again.

Referring now to Figs. 3, 5, 7 and 8, there is illustrated bulb holder 11 and the bulb-centering mechanism 52. The bulb 9 is seated in the bulb holder 11 in a cup-shaped member 53, the central axis of the bulb being vertical with the opening of the bulb at the top. The bulb is restrained against horizontal movement by three jaw fingers 54 spaced equidistantly around the bulb. The jaw fingers 54 are urged inwardly by the tension device or annular spring 55 so as to hold the bulb 9 securely in position. The jaws 54 pivot at their lower end about pins 56.

The top of the bulb 9 is accurately centered and aligned through the bulb-centering mechanism 52. A pair of centering jaws or levers 57, slotted or split to straddle the opening in the neck 9a of bulb 9, pivot about pin 58 fastened to center post 39. A pair of lugs 59 is securely fastened to the centering jaws 57 and have a pair of blades 60 secured to their free ends. A centering roller 61 is secured to each centering jaw 57. The centering rollers 61 are in contact with the control rod 26 when the centering jaws 57 are in the closed position. The upper ends of the centering jaws 57 are secured to toggle links 62, which, in turn, are fastened together with a protruding pin 63 adapted to be engaged by the upper part of the movable frame member 27. The centering jaws 57 are biased together by a spring 64.

In operation, the bulb-centering mechanism is actuated by the vertical movement of the movable frame member 27. As the movable frame member 27 moves upwardly, the upper corner 27a (Fig. 3) of frame member 27 pushes vertically against the protruding pin 63 so as to actuate the toggle. As the protruding pin 63 is moved upwardly the opposite ends of the toggle links 62 are brought toward each other thereby pivoting the centering jaws 57 about pin 58 and causing the blades 60 to move apart. As the movable frame member 27 moves downward and pressure is removed from the protruding pin 63, the spring 64 closes the centering jaws 57. To accurately center each jaw, rollers 61 come in contact with the control rod 26. When the jaws 57 are in a closed position the blades 60 engage the upper portion of the bulb 9 so as to accurately align and center the bulb 9 with respect to the jaws 16 and 17. As the movable frame member 27 is sequentially timed with respect to the bulb conveyor 12, a bulb 9 is moved into the bulb station directly below the mount-loading mechanism while the movable frame member 27 and the jaws 16 and 17 are in an upward position. At this time the centering jaws 57 are held open as described above. As jaws 16 and 17, which contain a mount, move down so as to assemble the mount with the lamp bulb 9, the centering jaws 57 begin to close and the blades 60 contact the upper portion of the bulb 9. The bulb 9 is then accurately located and aligned prior to the threading of the mount 1 with the bulb 9.

Figs. 6, 7, 8, and 9 illustrate an arrangement of the mount-threading apparatus whereby more than one mount threader can be used on one bulb conveyor, which would be desirable if the bulb conveyor 12 can be indexed at, for example, twice the speed of operation of the mount-loading mechanism. Furthermore, the mount conveyors 7 and 8 and the mount-threading apparatus may be arranged at any desirable angle to the bulb conveyor 12; for example, in Fig. 6 the mount-threading apparatus at station K is at an angle I with the bulb conveyor 12 while the mount-threading apparatus at station O is at angle J with the bulb conveyor 12.

It is, of course, necessary to properly align the bulb 9 and lamp mount 1 in the bulb holder 11 so that the outer ends of the leading-in wires 2 and 3 of mount 1 are brought in contact with the holding magnets 18 and 19 during and after assembly; and further it is necessary to properly align all the assembled bulbs and mounts with each other so that the assembled bulbs and mounts will be in proper relation to each other as the bulb is advanced along the bulb conveyor 12 to the subsequent work stations and machines. This result is achieved through the construction of the bulb holder 11 and its method of attachment to the bulb conveyor 12.

The bulb holder 11 consists of a rotatable section 65 and a stationary or base portion 66. The base portion 66 is securely fastened to the bulb conveyor 12 and may form one of the links of the chain comprising the bulb conveyor. The rotatable section 65 is rotatably secured to the base portion 66 by the pin 67 in such a manner that the rotatable section 65 can rotate or oscillate about its central vertical axis with respect to the base portion 66 and conveyor 12.

To properly position the bulb 9 and bulb holder 11 on the bulb conveyor 12, a compression spring 72, having one end 73 secured to the base portion 66 and the other end 74 secured to the rotatable section 65, biases the bulb holder 11 into the proper alignment. The rotatable section 65 is thereby rotatably biased against an adjustable stop 75 secured to the base portion 66.

As will be noted from Fig. 6, there is secured to each alternate rotatable section 65 a positioning roller 70 and secured to the remaining alternate rotatable sections 65 a positioning roller 71 spaced apart from the positioning roller 70. As a bulb is advanced by the bulb conveyor 12 into station K, for example, the roller 70 of each alternate bulb holder 11 will be brought against a positioning cam 68 which is secured to a stationary portion of the mount-threading mechanism. The movement of the bulb holder 11 into position at station K will cause the positioning roller 70, in contact with the positioning cam 68, to rotate the bulb holder 11 in a counterclockwise direction so that the mounts 1 being fed by the mount conveyors 7 and 8 will be properly aligned with the magnets 18 and 19 on the bulb holder 11.

As the bulb conveyor 12 is indexed so that a bulb moves from station K to station L, the roller 70 is disengaged from the cam 68 and the bulb holder 11 will return to its neutral position on the bulb conveyor 12, the precise alignment of the bulb holder 11 being determined by the position of the stop 75.

The mount-loading mechanism at station O has a positioning cam 69 secured to a stationary portion of the mount-loading mechanism and rotated in proper position to engage the roller 71 on the alternate bulb holder 11. The rotation and alignment of the bulb holder 11 at station O is similar to that described in connection with station K above.

It will be noted that when the cam 68 at station K is engaging a roller 70, the bulb holder 11 at station O does not have a roller 71 in proper position to engage the cam 69. Station O is illustrated out of phase by one dwell period with the remainder of the conveyor 12 for purposes of clarity. When a mount is being fed at station K, the mount conveyor at station O is going back to pick up another mount. In this manner a mount is being loaded at either station K or station O while a mount is being indexed by mount conveyors 7 and 8 at the alternate station. Both mount loaders are in the up position during the indexing of the bulb conveyor 12. Since all of the operations of the mount-loading mechanism are accomplished from two pairs of cams 21 and 33, each pair of cams can be timed 180° apart to make it possible for one unit to feed mounts into the odd numbered bulbs and the other unit to feed mounts into the even numbered bulbs.

While we have described only certain preferred embodiments of our invention by way of illustration, many modifications will occur to those skilled in the art, for example, any number of equivalents may be substituted for the two cams 21 and 33 and their respective operating systems. We, therefore, wish to have it understood that we intend in the appended claims to cover all such modifications as fall within the true spirit and scope of our invention.

What we claim as new and desire to secure by Letters Patent of the United States is:

1. In assembling apparatus for threading a lamp mount through an opening in a lamp bulb into the interior thereof, a supporting member, a movable frame carried by said supporting member for movement toward and away from the bulb opening, movable spaced jaws carried by said frame for gripping a lamp mount, a shaft having cam surfaces on opposite sides thereof, said shaft being carried by said supporting member and extending between the jaws, cam followers carried by said spaced jaws, means to hold said cam followers in engagement with said shaft, and means to move said frame toward the lamp bulb so that the cam followers travel along said shaft into contact with said cam surfaces to close said jaws around a lamp mount and thread the mount into the lamp bulb.

2. In assembling apparatus for threading a lamp mount through an opening in a lamp bulb into the interior thereof, a supporting member, a movable frame carried by said supporting member for movement toward and away from the bulb opening, movable spaced jaws carried by said frame for gripping a lamp mount, a rotatable shaft having cam surfaces on opposite sides thereof, said shaft being carried by said supporting member and extending between the jaws, cam followers carried by said spaced jaws, means to bias said cam followers into engagement with said shaft, means to move said frame toward the lamp bulb so that the cam followers travel along said shaft into engagement with said cam surfaces to close said jaws around a lamp mount and move it into the interior of the lamp bulb, and means to rotate said shaft to disengage said cam followers from said cam surfaces so as to separate said jaws to release the mount within the lamp bulb.

3. In assembling apparatus for threading a lamp mount through an opening in a lamp bulb into the interior thereof, a supporting member, a movable frame carried by said supporting member for movement toward and away from the bulb opening, movable spaced jaws carried by said frame for gripping a lamp mount, a shaft having cam surfaces on opposite sides thereof, said shaft being carried by said supporting member and extending between the jaws, cam followers carried by said spaced jaws, means to bias said cam followers into engagement with said shaft, a mount holder including spaced arms pivoted to said supporting member for carrying a lamp mount between said arms, and means to move said frame and jaws toward the lamp bulb so that the cam followers travel along said shaft into engagement with said cam surfaces to close said jaws around the lamp mount carried by said mount holder and thread the mount into said lamp bulb, said frame upon movement toward said bulb contacting said mount holder to pivot the spaced arms out of the path of movement of said jaws to release the mount.

4. In assembling apparatus for threading a lamp mount through an opening in a lamp bulb containing shredded foil into the interior thereof, a supporting member, a movable frame carried by said supporting member for movement toward and away from the bulb opening, movable spaced jaws carried by said frame for gripping a lamp mount, a mount holder including spaced arms pivoted to said supporting member for suspending a lamp mount between said arms, means to move said frame and jaws toward the lamp bulb to position said jaws between said spaced arms of the mount holder, and means actuated by movement of said frame to close said jaws around the lamp mount suspended on said arms and thread the mount into said lamp bulb and said shredded foil, said frame contacting said mount holder upon movement toward the lamp bulb to pivot the spaced arms out of the path of movement of said jaws to release the mount.

5. In assembling apparatus for threading a lamp mount having spaced, parallel, elongated, lead-in wires through an opening in a lamp bulb into the interior thereof, a supporting member, a movable frame carried by said supporting member for movement toward and away from the bulb opening, movable spaced jaws carried by said frame, said jaws having elongated finger-like portions for engaging and gripping the elongated lead-in wires of the lamp mount, a mount holder including spaced arms pivoted to said supporting member for suspending a lamp mount between said arms, means to move said frame and jaws toward the lamp bulb to position the finger-like portions of said jaws between said spaced arms of the mount holder, and means actuated by movement of said frame to close the finger-like portions of said jaws around the elongated lead-in wires of the lamp mount suspended on said arms and to move the finger-like portions and mount into the interior of the lamp bulb, said frame contacting said mount holder upon movement toward the lamp bulb to pivot the spaced arms out of the path of movement of said jaws to release the mount.

6. Assembly apparatus for threading a lamp mount having parallel, elongated, lead-in wires assembled in spaced relationship with a ceramic bead into the interior of a lamp bulb comprising, in combination, a supporting member, a movable element carried by said supporting member for movement toward and away from the bulb opening, movable spaced jaws carried by said element, said jaws having elongated finger-like portions for engaging and gripping the elongated lead-in wires of the lamp mount adjacent the bead, means actuated by movement of said movable element to close said jaws around the lamp mount, and means to move said movable element and jaws toward the lamp bulb to position the finger-like portions of said jaws and the lamp mount through the opening of the lamp bulb into the interior thereof.

7. In assembling apparatus for threading a lamp mount through an opening in a lamp bulb into the interior thereof, a supporting member, a movable frame carried by said supporting member for movement toward and away from the bulb opening, movable spaced jaws carried by said frame for gripping the lamp mount, a shaft having cam surfaces on opposite sides thereof, said shaft being carried by said supporting member and extending between said jaws, cam followers carried by said spaced jaws, means to bias said cam followers into engagement with said shaft, spaced levers pivoted to said supporting member, a blade carried by each lever for engaging the lamp bulb, means interconnecting said frame and said levers to pivot said levers and bring said blades into engagement with the lamp bulb to position the bulb in alignment with said jaws, and means to move said frame and jaws toward the lamp bulb so that the cam followers travel along said shaft into engagement with said cam surfaces to close said jaws around a lamp mount and thread the mount into said lamp bulb.

8. In assembling apparatus for threading a lamp mount through an opening in a lamp bulb into the interior thereof, a supporting member, a movable frame carried by said supporting member for movement toward and away from the bulb opening, movable spaced jaws carried by said frame for gripping the lamp mount, a shaft having cam surfaces on opposite sides thereof, said shaft being carried by said supporting member and extending between said jaws, cam followers carried by said spaced jaws, means to bias said cam followers into engagement with said shaft, movable spaced blades for engaging the lamp bulb, means for mounting said blades on said supporting member and responsive to movement of said frame to center the bulb in alignment with said jaws, and means to move said frame and jaws toward the lamp bulb so that the cam followers travel along said shaft into engagement with said cam surfaces to close said jaws around the lamp mount and thread the mount into said lamp bulb.

9. In assembling apparatus for threading a lamp mount through an opening in the lamp bulb into the interior thereof, a supporting member, a movable frame carried by said supporting member for movement toward and away from the bulb opening, movable spaced jaws carried by said frame for gripping the lamp mount, spaced levers pivoted on said supporting member, means interconnecting said frame and said levers for pivoting said levers upon movement of said frame, a blade carried by the end of each lever for engaging the lamp bulb, means to move said frame and jaws toward the lamp bulb, and means actuated by movement of said frame toward the bulb opening to close said jaws around the lamp mount and thread the mount into said lamp bulb, movement of said frame toward the bulb opening serving to actuate said interconnecting means to pivot the spaced levers to bring said blades into engagement with the lamp bulb to center the bulb in alignment with said jaws.

References Cited in the file of this patent

UNITED STATES PATENTS

| | | |
|---|---|---|
| 869,317 | Marshall | Oct. 29, 1907 |
| 2,098,030 | Donovan | Nov. 2, 1937 |
| 2,257,217 | Bailey | Sept. 30, 1941 |
| 2,425,127 | Schafer | Aug. 5, 1947 |
| 2,431,279 | Remington | Nov. 18, 1947 |